United States Patent [19]
Boyer

[11] 3,812,281
[45] May 21, 1974

[54] LOCKING ASSEMBLY
[76] Inventor: Fred S. Boyer, 5638 N. Kostner, Chicago, Ill. 49646
[22] Filed: May 21, 1973
[21] Appl. No.: 362,197

[52] U.S. Cl. .................................. 174/53, 339/131
[51] Int. Cl. ............................................ H02b 1/10
[58] Field of Search ......... 174/53; 248/27; 339/126, 339/131

[56] References Cited
UNITED STATES PATENTS
| | | | |
|---|---|---|---|
| 1,992,059 | 2/1935 | Despard | 174/53 |
| 2,248,201 | 7/1941 | Russell et al | 174/53 |
| 2,560,507 | 7/1951 | Despard | 174/53 |

Primary Examiner—Bernard A. Gilheany
Assistant Examiner—David A. Tone
Attorney, Agent, or Firm—Molinare, Allegretti, Newitt & Witcoff

[57] ABSTRACT

Locking assemblies for the mounting of electrical components or other members to a plate member include at least one locking member positioned adjacent the edge of an aperture in the plate member in which the component is to be mounted. The locking member is hingedly connected to the plate member for rotation and includes a tab which is rotatable into an opening in the component or other member which is to be mounted on the plate when the locking member is rotated about its hinge.

15 Claims, 4 Drawing Figures

PATENTED MAY 21 1974  3,812,281

LOCKING ASSEMBLY

BACKGROUND AND SUMMARY OF THE INVENTION

The present invention relates to locking assemblies and, more particularly, to locking assemblies for mounting electrical components or other members to a plate member.

When electrically wiring building structures, electrical panels and the like, it is frequently necessary to select and install any one of a number of different electrical components in the wall of the building or in given panels or boxes. Such components may include, for example, indicator lights, electrical sockets and the like. It has been common practice in the past to employ what are generally referred to as Despard type mounting straps or plates in the installation of such components. Such Despard type plates generally comprise a plate or strap member having one or more apertures therein in which the desired component is positioned and tool receiving slots are located on opposite sides of the apertures. During assembly, the electrician inserts the desired component into the aperture until slotted openings in the component are positioned in the same plane as the aperture edges. He then inserts a screw driver or other suitable prying tool in the tool receiving slots and, with a twisting motion of the tool, laterally deforms the edges of the aperture adjacent the slotted openings into the component slots, locking the component in the aperture in the plate. The Despard plate with the various components mounted therein is then installed in an appropriate electrical box or the like and is covered with a suitable protective cover plate through which the components are exposed for use.

Such slotted opening Despard type mounting straps or plates suffer several disadvantages. In the first instance, the twisting force which must be applied to the screw driver or other twisting tool in order to laterally deform the aperture edges is frequently substantial, particularly where the plate is of considerable thickness. Thus, not only does the mounting operation require considerable muscular exertion by the electrician or assembler, but also presents some difficulty with respect to manual manipulation simultaneously of the component, the plate, and the twisting tool. Moreover, once the component has been mounted in place, the plate will be permanently deformed. Thus, unlocking and replacement of a component once it has been mounted to the prior Despard type plates is not only difficult, but once the component is removed from the plate, the plate is frequently deformed beyond reuse and must be discarded.

Locking assemblies constructed in accordance with the principles of the present invention overcome these several disadvantages. In the locking assemblies of the present invention, a locking member may be easily and inexpensively formed on the plate member. Moreover, in the present invention the locking member will not interfere with the initial positioning of the electrical component or other member in the aperture of the mounting plate, and once the component has been so positioned, it may be easily, rapidly and without excessive manual exertion or manipulation firmly locked in the plate aperture. In addition, locking of components in the plate member of the present invention may be readily accomplished through the use of simple, readily available hand tools and in a manner which does not permanently deform the plate member, thus allowing reuse of the plate member. Moreover, removal and replacement of the components or other members which have been mounted to the plate may be easily and readily effected through the use of simple tools and without destructive deformation of the plate member, thus rendering removal and replacement of components quite easy and allowing the plate member to be reused over again after such replacement. Finally, the locking assemblies of the present invention may be employed with components which were designed for use with the prior Despard type plates without the need to change the construction of the components.

In a preferred locking device of the present invention, a substantially planar plate member includes at least one aperture therein which is adapted to receive a second member which is to be locked to the plate member, and at least one locking means is formed integrally with the plate member adjacent the aperture. The locking means includes hinge means and first and second tabs which extend in opposite directions from the hinge means and the locking means is rotatable about the hinge means between a first position in which the first tab extends from the plate member at an angle thereto and a second position in which the angle between the first tab and the plate member is reduced and the tip of the first tab extends beyond the edge of and into the aperture.

In another aspect of the present invention, a locking assembly is provided for mounting electrical components to a mounting plate. The assembly includes a plate member having at least one aperture therein and at least one of the electrical components extends through the aperture. The electrical component has an opening therein facing the edge of the aperture and the opening is positioned substantially in the plane of the plate member and means is located adjacent the edge of the aperture for resisting movement of the component and plate member relative to each other when the component is positioned in the aperture. At least one locking means is also formed integrally with the plate member adjacent the aperture. The locking means includes hinge means and first and second tabs extending in opposite directions from the hinge means. The locking means is rotatable about the hinge means when a force is applied to the second tab between a first position in which the first tab is withdrawn from the opening in the component and a second position in which the first tab is inserted into the opening, whereby the component is locked in the aperture in the plate member.

These and other objects, features and advantages of the present invention will be more clearly understood through a consideration of the following detailed description.

BRIEF DESCRIPTION OF THE DRAWING

In the course of this description, reference will frequently be made to the attached drawing in which.

DESCRIPTION OF THE PREFERRED EMBODIMENTS

Figure 1:
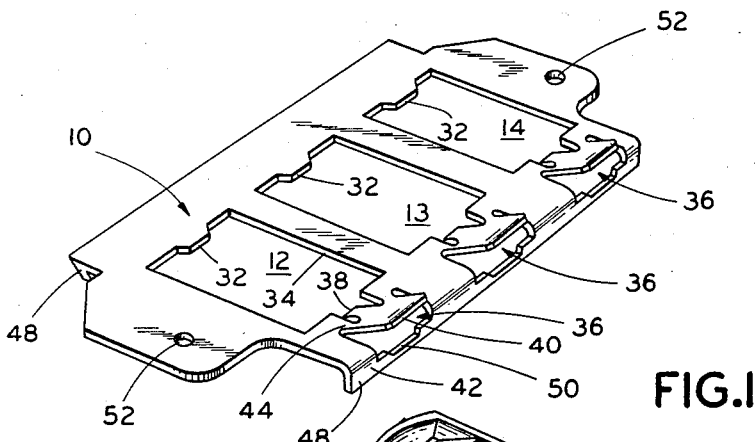
FIG. 1 is an exploded perspective view of a plate member and of several different electrical components which are to be mounted to the plate member in accordance with the principles of the present invention.
Figure 2:
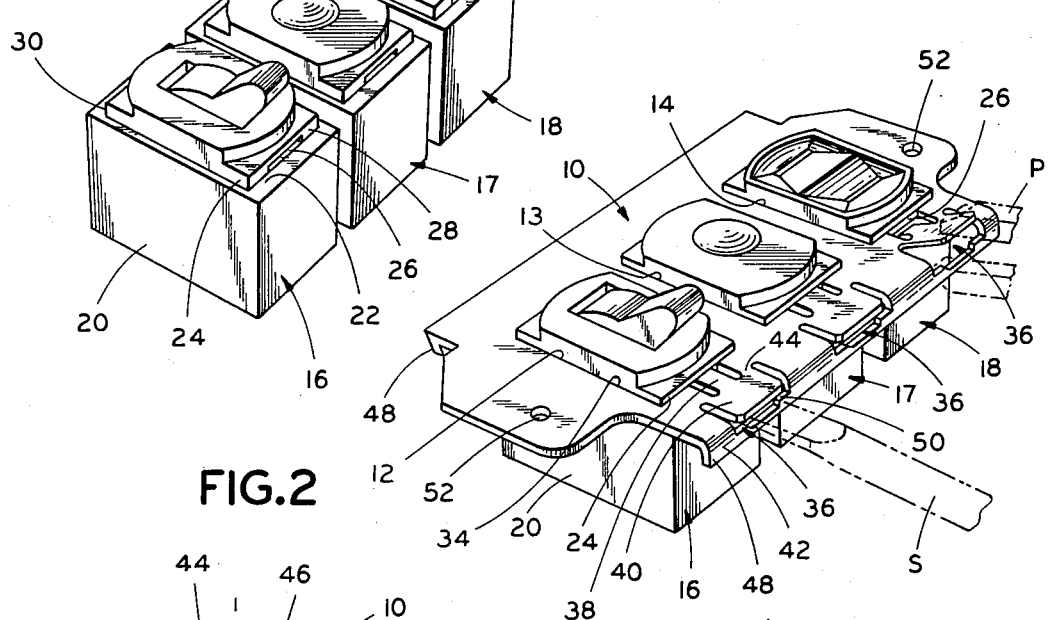
FIG. 2 is an assembled perspective view of the plate member and components shown in FIG. 1.

Referring particularly to FIGS. 1 and 2, an electrical assembly is shown comprising a substantially planar strap or plate member 10 having a plurality of spaced apertures 12, 13 and 14 therein which are adapted to receive any one of several electrical components. For example, such electrical components may include a switch assembly 16, an indicator light assembly 17, and an electrical socket assembly 18, as shown in FIGS. 1 and 2. Each of the electrical component assemblies generally comprises a moulded base housing portion 20 having an upward facing shoulder 22, the perimeter of which is somewhat larger than the perimeter of the aperture 12, 13 or 14 into which it is to be installed so that the shoulder 22 will rest against the underside of the plate member 10. Extending in elevation above the shoulder 22, is a stepped portion 24, the perimeter of which is slightly smaller than the perimeter of the apertures 12, 13 and 14 so that the portion 24 may be inserted into and positioned in the apertures of the plate member, as shown in FIG. 2. The stepped portion 24 of the respective electrical components 16, 17 and 18 usually includes a somewhat elongated slotted opening 26 on opposite vertical faces thereof into which the deformed plate material of the prior Despard type mounting strap or plate is deformed to hold and mount the respective components to the mounting plate. Although not shown in the drawing, both the front face 28 of step 24 and the opposite rear face 30 have such slotted opening 26 therein.

The mounting plate 10 of the present invention preferably includes a stationary locking tab 32 which is positioned so as to enter the slot in the rear face 30 of the various electrical components. The stationary tab 32 is formed upon the edge 34 of each of the apertures 12, 13 and 14 and extends into its aperture to prevent movement of the component and plate member relative to each other both during and after mounting of the component to the plate member.

Figure 3:
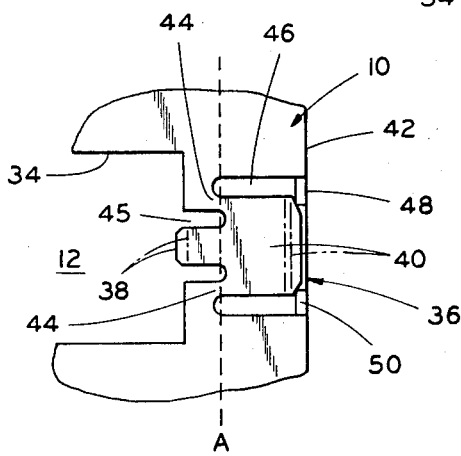
FIG. 3 is a partial plan view of one preferred form of locking member constructed in accordance with the principles of the present invention.

A rotatable locking member 36 is also positioned on the side edge of the aperture opposite the stationary tab 32. The locking member 36 is formed integrally with the plate member 10 preferably by stamping the locking member from the plate material. As shown particularly in FIG. 3, the locking member 36 includes a first tab 38 which, when it is rotated so that it is parallel to the planar surface of the plate member 10, extends beyond the edge 34 of its aperture 12, 13 or 14 into the aperture, as shown in solid lines in FIG. 3. The locking member 32 also includes a second tab 40 which is preferably formed in coplanar relationship to the tab 38 and extends toward the outer edge 42 of the plate member 10. When forming the locking devices 36, a portion of the plate material is removed between the tabs 38 and 40 so as to form integral hinge means 44 between the tabs and the plate member as shown in FIG. 3. The removed portion thus defines slots 45 and 46 in the face of the plate member 10 in which the tabs 38 and 40 rotate.

The longitudinal outer edges 42 of the plate member 10 are preferably turned down somewhat along their length to form reinforcing flange 48. A tool receiving opening 50 is formed in the flange 48 adjacent and beneath each of the locking devices 36. Thus, flanges 48 not only assist in structurally strengthening the plate member 10, but also provide a prying or gripping surface at openings 50 for rotating the locking members 36 about their pivot axis A to effect locking and unlocking of the electrical components from the plate member 10.

Finally, the plate member 10 is also preferably formed with suitable openings 52 as needed for the receipt of screws, bolts or the like (not shown) for attaching the mounted components into a suitable electrical box or the like (not shown).

Although it is believed that the manner of mounting and demounting the electrical components 16, 17 and 18 to or from the plate member 10 will be clear from the foregoing description, the manner of assembly and disassembly will be now described.

Initially, the locking members 36 are each angularly positioned relative to the plate member as shown in FIG. 1. One of the electrical components 16, 17 or 18 is now inserted upward through the aperture 12, 13 or 14 in which it is desired that the component be mounted. During insertion, the stationary tab 32 is hooked into the slot 26 on side 30 of the component. When the component has been fully inserted in its aperture, the enlarged shoulder 22 of the component will rest against the underside of the plate member 10, and the step portion 24 will extend upward through its aperture as shown in FIG. 2. Insertion of the component 16, 17 or 18 in its aperture will not be hampered by tab 38 of the locking member 36, since when the locking member is rotated to the position shown in FIG. 1 and the extreme right in FIG. 2, both the first and second tabs 38 and 40 extend at a substantial angle to the plane of the plate member and tab 38 will be rotated to the dot and dash position shown in FIG. 3. In this position, the tip of tab 38 lies outside the vertical projection of the edge 34 of the aperture 12. Thus, the tab 38 will not interfere with the insertion of the component in its aperture.

Once the component 16, 17 or 18 is positioned in its aperture, the tab 40 and the flange 48 may be clamped between the jaws of a pliers P so as to exert a force on the locking member 36, whereby the locking member rotates about the pivot axis A of the hinge 44 to the position shown in FIG. 2. Thus, when the locking member is rotated such that the tabs 38 and 40 are moved into substantially coplanar relationship with the plate member 10, the tip of the tab 38 will move from the position shown in dot and dash in FIG. 3 to the position shown in solid in which the tip now extends beyond the edge 34 and into the aperture 12. In this position, the tip of tab 38 will move into the slotted opening 26 in the component, locking the component in the aperture 12.

This procedure may now be repeated for the other respective components to be installed in the plate member.

If it is desired to remove or replace one of the components 16, 17 or 18, a screw driver S or other suitable prying instrument may be inserted in the opening 50 beneath the tab 40 of the locking device as shown in FIG. 2. A slight twist of the prying instrument S will cause the locking device 36 to rotate about the pivot axis A of the hinge 44 back to the position shown in the far right in FIG. 2, thus releasing the component and allowing it to be easily removed from the plate member 10 without permanently deforming the plate member beyond reuse.

Figure 4:
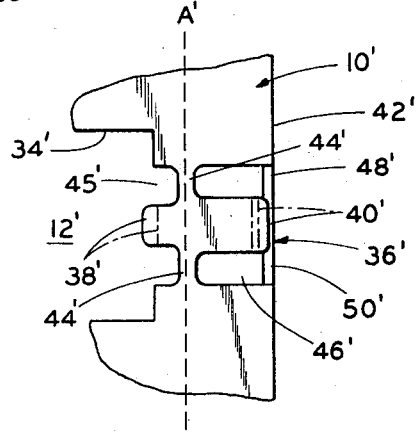
FIG. 4 is a partial plan view of another preferred embodiment of locking member of the present invention.

Referring to FIG. 4, a second preferred embodiment of locking member 36' is shown which is substantially identical in construction and manner of operation to locking member 36, except that the configuration of the hinge 44' is slightly different than hinge 44. Accordingly, the same reference characters that have been employed in the description of locking member 36 have been employed in FIG. 4, except that the latter characters have been "primed."

It will be understood that, although the present invention has been described in terms of the locking of electrical components into a plate member, the invention is not limited to use with electrical components only. Moreover, although a combination has been described having only one movable and one stationary tab, the number and positioning of the tabs may be varied and all of the tabs may be movable tabs similar to those previously described.

It should also be understood that the embodiments of the present invention which have been described are merely illustrative of a few of the applications of the principles of the invention. Numerous modifications may be made by those skilled in the art without departing from the true spirit and scope of the invention.

What is claimed is:

1. A locking assembly for mounting a plate member and a second member together, comprising: a substantially planar plate member having at least one aperture therein adapted to receive the second member therein, at least one locking means formed integrally with said plate member adjacent said aperture, said locking means including hinge means and first and second tabs extending in opposite directions from said hinge means, said locking means being rotatable about said hinge means between a first position in which said first tab extends from said plate member at an angle to the plane thereof and a second position in which the angle between said first tab and the plane of said plate member is reduced and the tip of said first tab extends beyond the edge of said aperture and into said aperture, whereby to engage the second member.

2. The assembly of claim 1 including second locking means adjacent the edge of said aperture diametrically opposite said first mentioned locking means.

3. The assembly of claim 1 wherein the tip of said first tab is located outside of the vertical projection of the edge of said aperture when said locking means is in said first position.

4. The assembly of claim 1 wherein both of said tabs extend at an angle to the plane of said plate member when said locking member is in said first position and both tabs extend substantially parallel to said plane when said locking means is in said second position.

5. The assembly of claim 1 including a slot extending from the edge of said aperture, said first tab being movable in said slot upon rotation of said locking means.

6. The assembly of claim 1 including unlocking means associated with said second tab to assist in the rotation of said locking means from said second position to said first position.

7. The assembly of claim 6 wherein said unlocking means comprises a second aperture in said plate member beneath said second tab.

8. The assembly of claim 1 wherein the pivot axis of said hinge means is spaced from the edge of said aperture.

9. A locking assembly for mounting electrical components to a mounting plate, comprising:
a substantially planar plate member having at least one aperture therein,
at least one of said electrical components extending through said aperture, said electrical component having an opening therein facing the edge of said aperture and positioned substantially in the plane of said plate member,
means positioned adjacent the edge of the aperture for resisting movement of said component and plate member relative to each other when said component is positioned in said aperture, and
at least one locking means formed integrally with said plate member adjacent said aperture and substantially opposite said means for resisting movement, said locking means including hinge means and first and second tabs extending in opposite directions from said hinge means, said locking means being rotatable about said hinge means when a force is applied to said second tab between a first position in which said first tab is withdrawn from the opening in said component and a second position in which said first tab is inserted in said opening, whereby said component is locked in the aperture in said plate member.

10. The assembly of claim 9 wherein the tip of said first tab is located outside of the vertical projection of the edge of said aperture when said locking means is in said first position.

11. The assembly of claim 9 wherein both of said tabs extend at an angle to the plane of said plane member when said locking member is in said first position and both tabs extend substantially parallel to said plane when said locking means is in said second position.

12. The assembly of claim 9 including a slot extending from the edge of said aperture, said first tab being movable in said slot upon rotation of said locking means.

13. The assembly of claim 9 including unlocking means associated with said second tab to assist in the rotation of said locking means from said second position to said first position.

14. The assembly of claim 13 wherein said unlocking means comprises a second aperture in said plate member beneath said second tab.

15. The assembly of claim 9 wherein the pivot axis of said hinge means is spaced from the edge of said aperture.

* * * * *